United States Patent [19]

Foertsch et al.

[11] 4,442,155
[45] Apr. 10, 1984

[54] LONGITUDINALLY DIVIDED CABLE SLEEVE OF SHRINKABLE MATERIAL HAVING CLOSURE ELEMENTS ALONG ITS LONGITUDINAL EDGES

[75] Inventors: Johann Foertsch, Kronach-Friesen; Hans-Juergen Meltsch, Germering, both of Fed. Rep. of Germany

[73] Assignee: Siemens Aktiengesellschaft, Berlin & Munich, United Kingdom

[21] Appl. No.: 444,345

[22] Filed: Nov. 24, 1982

[30] Foreign Application Priority Data

Dec. 4, 1981 [DE] Fed. Rep. of Germany ....... 3148135

[51] Int. Cl.³ .......................... B32B 3/06; F16L 9/00; H02G 13/06; F16L 33/00
[52] U.S. Cl. ...................... 428/99; 138/156; 138/166; 138/167; 138/168; 174/92; 174/DIG. 8; 24/19; 24/20 R; 24/20 EE; 24/33 R; 428/36; 428/100
[58] Field of Search .................. 428/99, 100; 138/156, 138/166, 167, 168; 174/92, DIG. 8; 24/19, 20 R, 20 EE, 33 R

[56] References Cited

U.S. PATENT DOCUMENTS

| | | | |
|---|---|---|---|
| 3,379,218 | 4/1968 | Conde | 174/DIG. 8 |
| 4,241,119 | 12/1980 | Smart | 174/DIG. 8 |
| 4,252,849 | 2/1981 | Nishimura et al. | 138/156 |
| 4,268,559 | 5/1981 | Smuckler | 138/156 |
| 4,371,578 | 2/1983 | Thompson | 174/DIG. 8 |
| 4,396,656 | 8/1983 | Still et al. | 174/92 |
| 4,399,840 | 8/1983 | Lee | 138/156 |

FOREIGN PATENT DOCUMENTS

| | | |
|---|---|---|
| 1947057 | 3/1970 | Fed. Rep. of Germany . |
| 54-159722 | 12/1979 | Japan . |
| 1503328 | 3/1978 | United Kingdom . |

Primary Examiner—William R. Dixon, Jr.
Attorney, Agent, or Firm—Hill, Van Santen, Steadman & Simpson

[57] ABSTRACT

A longitudinally divided cable sleeve characterized by a strip-like sleeve member which is composed of a heat-shrinkable material and has two longitudinal edges with reinforcing inserts to form first and second edges with reinforced portions, and coacting closure elements for joining the edges together with the elements on the first edge being bent from strips of material and having a head portion that is received in a slot or opening in the second edge. Preferably, each of the elements bent from a strip of material has a link portion, which is received in a slot of the first edge up to an abutment surface and a projecting closure part which is inserted through the opening of the second edge is provided with a latch element to prevent accidental and unintentional disassembly of the closure elements after the projecting closure part is inserted through the opening of the second edge.

34 Claims, 24 Drawing Figures

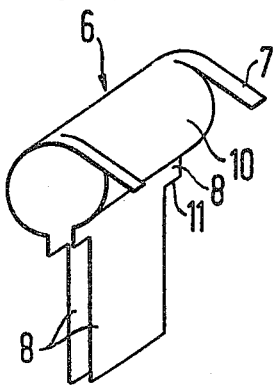
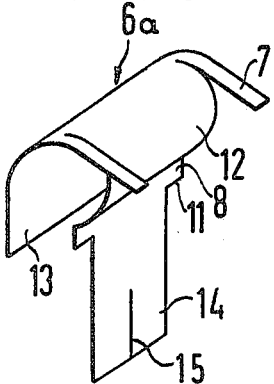
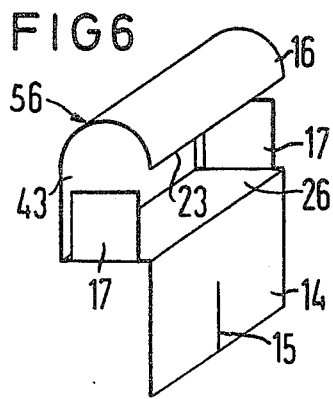
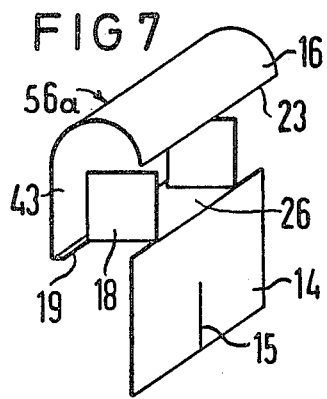
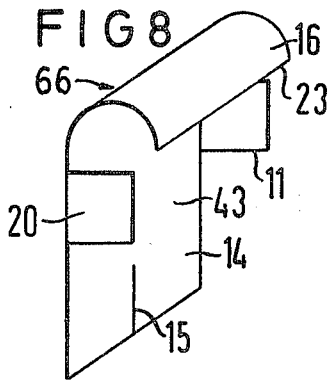
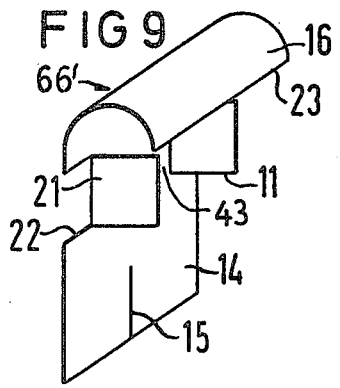

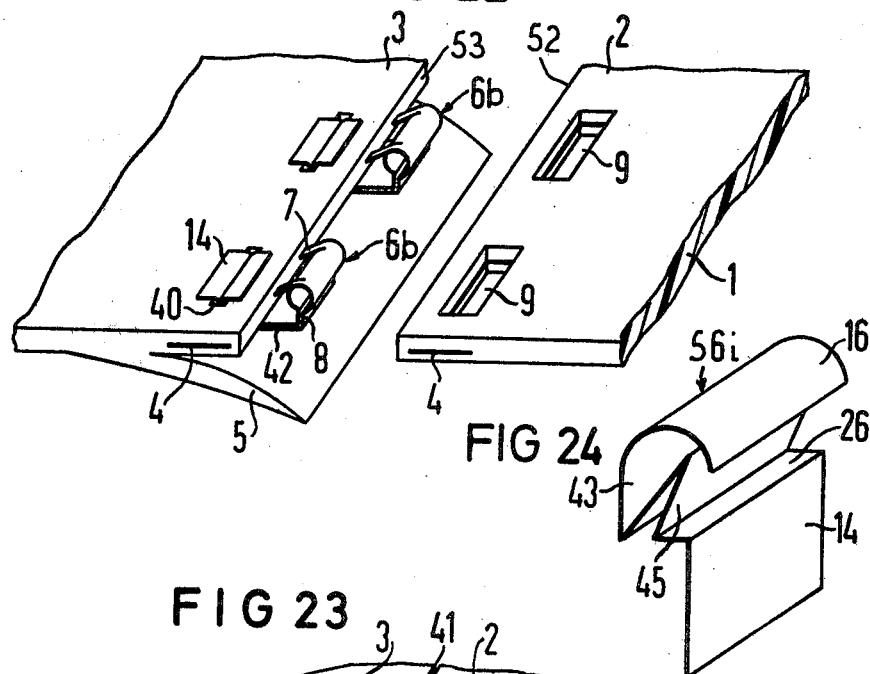
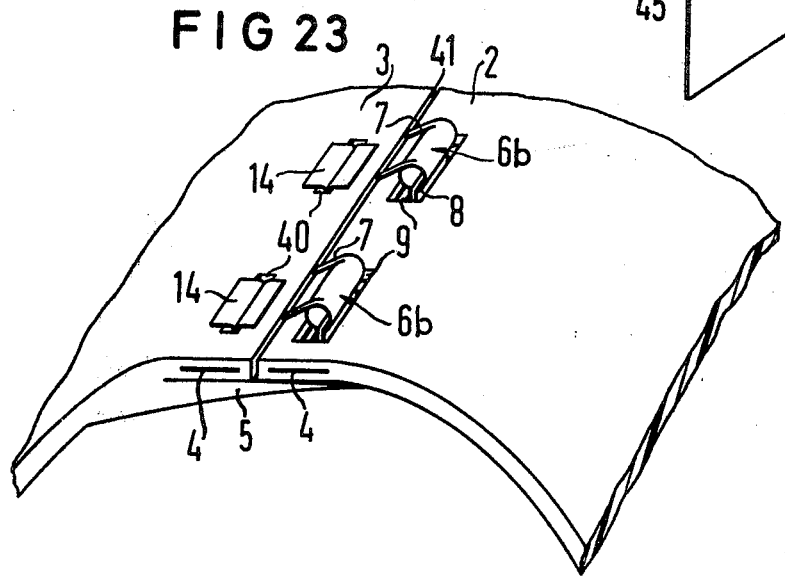

LONGITUDINALLY DIVIDED CABLE SLEEVE OF SHRINKABLE MATERIAL HAVING CLOSURE ELEMENTS ALONG ITS LONGITUDINAL EDGES

BACKGROUND OF THE INVENTION

The present invention is directed to a longitudinally split or divided cable sleeve consisting of a shrinkable material which has reinforcing inserts adjacent each longitudinal edge and coacting closure means for closing the two edges consisting of closure elements mounted on one of the edges which are received in openings or apertures formed in the reinforced portion of the second edge.

A longitudinally divided cable sleeve, which consists of a heat-shrinkable material and has coacting closure means is disclosed in U.S. patent application Ser. No. 313,342, filed Oct. 20, 1981, which application was based on German application No. P 30 48 051. In this copending application, the longitudinal edges of the divided cable sleeve are disposed in overlapping relationship with one edge being provided with hook-like elements and the second edge being provided with latch elements that are aligned and received the hook elements. The hook and latch elements were disposed either on mechanical reinforcing elements or secured thereto and the reinforcing elements were secured to the cable sleeve along its longitudinal edges. The closure elements of this cable sleeve were designed as pins which had enlarged or swollen ends which were engaged in holes in the second longitudinal edge. Since the respective application of forces, which occur during a shrinkage operation, would be directed at each point of the pin and hole, this arrangement had problems with stability during a shrinking operation. The application also disclosed an embodiment which had coacting hook elements which extend along each of the edges. However, these continuous hook elements reduce the flexibility of the closure arrangement.

SUMMARY OF THE INVENTION

The present invention is directed to providing a longitudinally divided cable sleeve having a strip-like sleeve member composed of heat-shrinkable material and having two longitudinal edges with reinforcing inserts to form first and second edges with reinforcing portions and coacting closure means for closing the edges together which coacting closure means is simple in structure, can already be securely engaged during assembly operation and will no longer open up during the shrinking process. In addition, the individual closure elements should cover the largest possible area while retaining the flexibility of the overall closure means in order to obtain a uniform distribution of the shrinkage forces.

To accomplish these goals, the present invention is directed to an improvement in a longitudinally divided cable sleeve having a strip-like sleeve member composed of heat-shrinkable material, said sleeve member having two longitudinal edges with reinforcing inserts to form first and second edges with reinforced portions and coacting closure means for closing said edges together comprising closure elements mounted along the first edge and being engaged in openings formed in the reinforced portion of the second edge to hold the two edges in a closed position. The improvements comprise each of the elements having link means for mounting the element such as in axially extending slots to the area of the reinforced portion of the first edge, each element having abutment means for limiting the depth of insertion of the link means into the slots, each element having a projecting closure part for being inserted through an opening of the second edge with each projecting closure part having at least one latching element extending therefrom so that when the openings of the second edge are placed on the closing elements, said latching elements engage an outer surface adjacent each opening to prevent accidental and unintentionally disassembly of the closure means.

The invention is directed to a plurality of embodiments in which each of the closure elements can be manufactured as independent parts such as by being bent from a strip-like or band-like material and after manufacturing can be inserted and anchored in a very simple manner to the strip-like sleeve member. The shape of each of the closure elements is kept rather narrow and the closure elements are mounted onto the reinforced portion or, respectively, introduced into slots in the reinforced portion which extend parallel to the longitudinal edge of the strip-like sleeve member to extend along the longitudinal axial direction of the cable sleeve. Thus, each of the reinforcing inserts along the longitudinal edge can likewise be kept narrow which will improve the flexibility of the closure system.

One of the features of the invention is that each of the closure elements cannot be passed through the reinforced portion of the first edge because of the presence of the abutment means. The abutment means can be formed by a lateral edge between the projection part and the link means, a tab, or a planar portion extending at right angles to the link means. In addition, a sufficient fixation in the radial direction can be obtained by fastening of the link means on the opposite surface of the reinforced portion of the cable sleeve. Due to the presence of at least one latching element on each of the projecting closure parts, the latching element will engage the surface of the second longitudinal edge adjacent the opening after the opening has been placed on a projecting closure part. The latching elements are designed either as a projecting or overhanging edge on projecting parts or a projection tab of the projecting part.

Because the closure elements and the holes or openings are both formed in the reinforced portion adjacent each longitudinal edge, the softening of the shrinkage material during the shrinking process will not affect the coating closure means. The reinforced portion consists, for example, of metal strips which are either perforated or unperforated and which may be potentially provided with an adhesive promoter. By so doing, good adhesion between the shrinkage material and the reinforcing strips is guaranteed. However, the reinforcing strips or insert along the longitudinal edges can also be formed of a temperature-resistant woven fiber which may be metal, fiberglass, dual plastic synthetics or high temperature-resistant thermoplastic fibers or threads. These woven fibers or threads are additionally stiffened as needed by means of saturation, immersion or by other coatings or suitable materials.

BRIEF DESCRIPTION OF THE DRAWINGS

FIG. 4 is an enlarged perspective view of the closure element utilized in FIGS. 2 and 3;

FIGS. 5–21 are enlarged perspective views of modifications and embodiments of the closure element which can be used in the closure system illustrated in FIGS. 2 and 3;

FIGS. 22 and 23 show an embodiment of the closure system of the present invention wherein the longitudinal edges do not overlap with FIG. 22 being an enlarged perspective view of the closure elements in a disassembled position and FIG. 23 being an enlarged perspective view of the edges being closed by the system according to the present invention; and FIG. 24 is a perspective view of another embodiment of the closure element which can be used in the closure system of FIGS. 1, 2 and 3.

DESCRIPTION OF THE PREFERRED EMBODIMENTS

Figure 1:
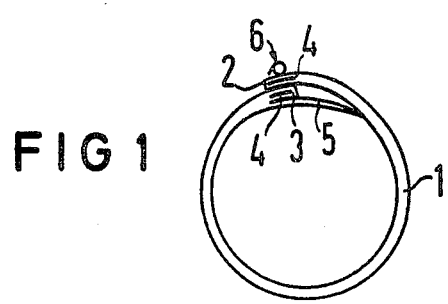
FIG. 1 is an end view of a longitudinally split cable sleeve with a closure system in accordance with the present invention.

The principles of the present invention are particularly useful in a longitudinally divided or split cable sleeve 1 of FIG. 1. The cable sleeve 1 consists of a shrinkable material and has two longitudinal edges 2 and 3 which are held in a closed-together condition as illustrated by a closure system or means. As illustrated, each of the edges 2 and 3 has a longitudinally extending reinforcing insert 4 to form reinforced portions adjacent each actual edge 52 and 53. The closure system includes closure elements 6 which are mounted on the reinforced portion of a first edge 3 and are received in openings or apertures 9 (FIGS. 2 and 3) which are formed in the reinforced portion of a second edge 2. Due to the structure of the closure means or system, a uniform distribution of the shrinkage force is applied thereto and because the parts of the closure system are in the reinforced portion, the softening of the material which occurs during the shrinking process will not cause inadmissible or undesirable deformations. In addition, as illustrated in FIG. 1, the joint or separation of the split cable sleeve 1 is bridged or covered over by an internal flap or extension 5, which is provided on the first edge 3 and engages the inner surface of the cable sleeve 1 adjacent the second edge 2. A seal of the closure system can be undertaken by means of inserts such as seals or by applying a coating consisting of a suitable sealing material, for example, a meltable adhesive which is activated at the shrinkage temperature.

Figure 2:
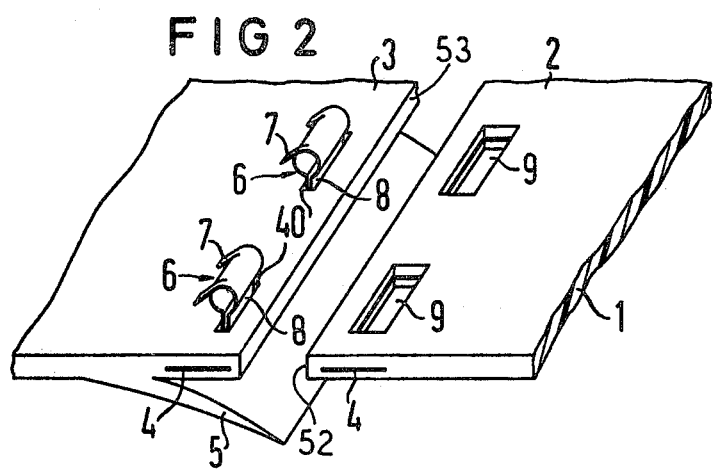
FIG. 2 is an enlarged perspective view of the edges illustrating the closure system of the present invention as disassembled.
Figure 3:
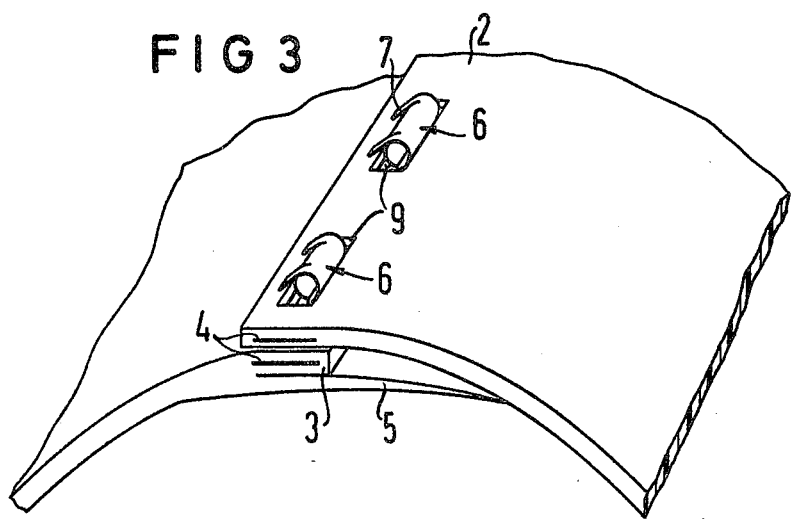
FIG. 3 is an enlarged perspective view of the edges illustrating the closure system while engaged or assembled.

A more detailed illustration of the joint area formed between the two longitudinal edges 2 and 3 of the sleeve 1 is illustrated in FIGS. 2 and 3. It becomes clear that the first longitudinal edge 3 carries the actual closure elements 6 whereas the second longitudinal edge 2 contains the corresponding cutouts or openings 9 for receiving the closure element 6. The reinforcing members 4 are illustrated as being embedded in the shrinkable material along the closing areas of both the edges 2 and 3 and thus prevents a migration of the shrinkage material while in a softened state. In the embodiment illustrated in FIGS. 1, 2 and 3, the closing occurs with the edge 2 overlapping the edge 3 and with the two reinforcing inserts 4 being positioned one above the other as best illustrated in FIG. 3.

The individual closure elements 6 are bent or formed from a tape or ribbon-shaped material which is preferably a corrosion-proof material and have an approximately cylindrical-like closure part, which projects radially above the outer surface of the first edge 3. The projecting closure part has approximately the same dimensions as the width of the opening 9 on the second longitudinal edge 2 so that the part can be pressed through the opening. Each of the projecting parts have latching means or elements 7 which are illustrated as being tab-like extensions which extend tangentially from the cylindrical portion of the projecting part. As best illustrated in FIG. 3, when the projecting part extends through the aperture or opening 9, the latching means 7 will engage an upper surface of the edge 2 adjacent each aperture 9 to prevent accidental disengagement. The latching element 7 allows easy insertion of the head or part through the aperture 9 but during the shrinking operation prevents an automatic release of the closure means. In fact, with the selected design of the elements 6, the latching device 7 becomes even more effective as a result of the tension forces applied on the sleeve 1 due to the influence of the shrinking force.

Each of the closure elements 6 is secured in a reinforced portion of the first edge 3 with a spacing shown by portion 8 which corresponds approximately to the thickness of the second longitudinal edge 2. As illustrated, the sheet material or ribbon-like material of the elements 6 extends into a longitudinally extending slit 40 in the reinforced portion for securing each of the elements 6 in their reinforced portion. Finally, as indicated in FIG. 3, the inside extension or flap 5 covers the joint formed by the overlapped edges 2 and 3 and the seal is undertaken by suitable inserts or by the use of a sealing material.

The closure element 6, which is best illustrated in FIG. 4, is bent or formed from a band or strip of material. As illustrated, the closure element 6 is composed of the actual projecting closure part or head 10 which has a cylindrical shape and a pair of mounting links 14 extending therefrom. The cylindrical shape of the projecting head 10 provides an undercut for receiving the edges of the apertures 9 in the second edge 2. The cylindrical part begins above a stay or part 8; whose height approximately corresponds to the thickness of the second longitudinal edge 2 so that the longitudinal edge 2 can press against the entire width of the closure element 6 with the periphery of its openings 9. The latching devices or element 7, which are designed as projecting sections of the cylindrical part 10 prevent the unlatching of the part from the openings 9 of the second longitudinal edge 2. These closure parts 6 are fastened with link means which include mounting links 14 which are extensions of the part 8, which is of a greater width than the links 14. The links 14 are inserted from the outside through the longitudinally extending slots 40 of the sleeve 1 (FIG. 2) and have the width which matches the length of the slots 40. The links 14 can be secured to the inside of the sleeve 1, for example, by means of bending the mounting links over and abutments 11, which are the shoulders or edges between the portions 14 and the spacing part 8 engage the outer surface of the sleeve and prevent the overall closure elements 6 from slipping through. In the embodiment of FIG. 4, two mounting links 14 are provided and both are conducted through a single slot 40. The slots 40 are formed in the reinforced portion, which is formed by the reinforcing insert or member 4 and due to a longitudinal direction of the slots and the closure elements 6, the insert 4 can be kept very narrow. Thus, the closure system has an increased flexibility.

A modification of the closure elements 6 is illustrated by the closure elements 6a of FIG. 5. In the closure element 6a, the ribbon or tape-like material is bent in such a manner that a second mounting link 14 is not present. Here, a projecting part 12 consists only approximately of a semi-cylindrical bent surface which has a portion pointing tangentially down and parallel to the link 14 to form a support 13 whose end surface will rest on the outer surface of the sleeve member 1 when the link 14 is inserted into the slot such as 40. The effect of the support 13 is to prevent the part 12 from buckling when subjected to tangentially applied shrinking forces. As in the previous embodiment, a portion of the semi-circular closure part 12 has been cut and bent to form the latching devices or elements 7 which will prevent the unlatching of the openings 9 of the second longitudinal edge 2. The mounting link 14 can be provided with a slot 15 so that it can be possible to fold or bend the portion of the link 14 in both directions after insertion into the slot 40 of the sleeve member. The sample embodiment can also be modified in such a manner that the mounting link 14 and the support 13 merge into one another to form an undercut in a certain sense due to a section of the semi-circular closure part 12. The spacing part 8 with the offset edges form the abutments 11 and must then likewise be transferred.

In the following sample embodiments illustrated in FIGS. 6 through 19, the projecting closure part of the closure element is designed as an arcuate surface or arcuate portion 16 which has a semi-circular cross-section with its one edge merging into a planar portion 43. A free edge 23 of the arcuate portion is directed toward the surface of the sleeve member and terminates above the surface of the sleeve member so that when the second longitudinal edge is assembled thereon, the surface of the member can be engaged by the free edge 23 and thus the closure means are secured against inadvertent unlatching. This is achieved by means of the selection of the curvature and the radius of the arc, namely, in such a manner that the edge 23 projects beyond the bearing and support surfaces situated therebelow so that latching for the opening 9 of the second longitudinal edge 2 will occur given a tangential pull of the shrinking forces.

In FIG. 6, a closure element 56 has the arcuate portion 16 forming the projecting closure part. Here, the portion 16 at one end is connected to the planar part 43, which is connected by a flat abutment surface 26 to the mounting link 14. Thus, when the link 14 is inserted in the aperture or slot such as 40, the portion 26 engages an upper surface of the cable sleeve. Whether or not the link 14 is provided with the slot 15, it is bent at right angles to engage the inner surface of the cable sleeve as the outer surface is engaged by the portion 26. The arcuate portion 16 with its edge 23 forms a latching device for the openings 9 of the second longitudinal edge in a manner already described. To supply support surfaces, tabs 17, which extend laterally from the abutment portion 26 are bent upright to extend radially outward at right angles to portion 26. As illustrated, the tabs 17 are not as wide as the abutment 26 and therefore the support surfaces which are an edge of the tab are set back from the position of the edge 23. Thus, the edge 23 will project and form the desired latching element.

In FIG. 7, a modification 56a of the closure element is illustrated. In this element, the sole difference is limited to the position of the supporting surfaces. As illustrated, the supporting surfaces are edges of tabs 18 which are cut directly from the abutment 26 and folded radially upward. A residual edge 19 is advantageous to provide the required stability and stiffening of the closure element. Otherwise, the element 56a and the element 56 are substantially similar.

An embodiment of the closure element is generally indicated at 66 in FIG. 8 and at 66' in FIG. 9. In the embodiment 66, the abutment edges 11 for limiting the insertion of the mounting link 14 are formed by edges of tabs 20 for the embodiment 66 or tabs 21 for the embodiment 66'. In addition, it is noted that the mounting links 14 are a continuation of the planar portion 43 of the closure part. Both the tabs 20 and 21 besides providing abutment surface 11, also provide support edges and stiffening of the closure elements 66 and 66'. It is noted that the major difference in the two modifications of this embodiment is that the tabs 20 are extensions of the portion 43 while the tabs 21 are cut out of the portion 43 and leave cut edges such as 22. It should also be noted that both the tabs 20 and 21 have a size so that the edge 23 extends past the vertical edges to form the latching elements or devices.

Figure 10:
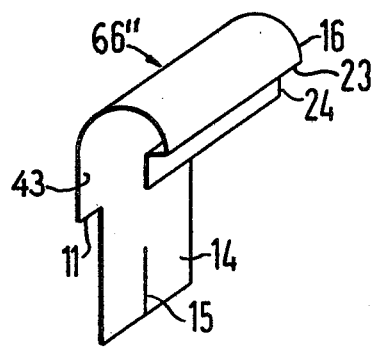

Another embodiment is generally indicated at 66" in FIG. 10. In this embodiment, the arcuate portion 16 has one side extending in a plane portion 43 and directly into the link 14 which has a lateral offset relationship to the portion 43 of the projecting part to form the abutment surfaces 11. The edges 23 at the termination of the arcuate portion 16 is not a cutoff edge but a folded edge having two planar portions to form a back face 24 which is set in from the edge 23. The back face 24 will prevent the aperture or opening 9 of the second edge after it has passed over the projecting portion from becoming dislodged and also from being drawn to a position to engage the portion 43 during the application of the shrinking forces. Thus, a firm and uniform seating of the closure element 66" is guaranteed.

Figure 11:
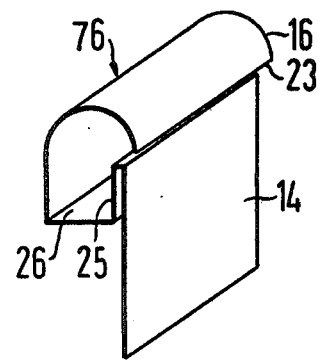

Another embodiment of the closure element is generally indicated at 76 in FIG. 11. In this embodiment, the mounting link 14 has a reverse bend with one leg 25 being connected to the abutment portion 26. The foldback formed by the leg 25 stiffens the upper portion of the link 14. Thus, the upper portion of link 14 stiffened by the portion 25 coacts with the free edge 23 of the arcuate portion 16. The edge 23 of the arcuate portion 16 again forms a latching device for engaging the surfaces adjacent the apertures or openings 9 as the edge of the opening is pulled against the perpendicular stops formed by the upper portion of the link 14 and the portion 25.

Figure 12:
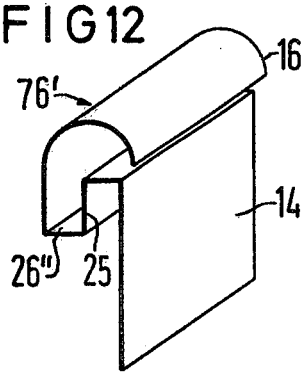

A modification of the closure element 76 of FIG. 11 is shown by the closure element 76' of FIG. 12. In this modification, the spacing of the portion 25 from the upper portion of the link 14 has been increased and thus causing the abutment portion 26" to be substantially narrower.

Figure 13:
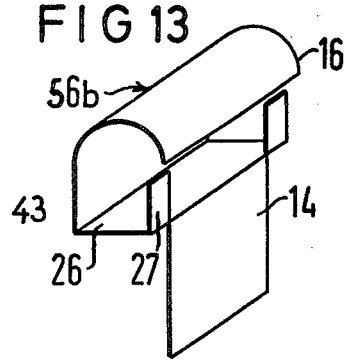

A modification of the closure element is generally indicated at 56b in FIG. 13. In the closure element 56b instead of using the edge of a foldup flap to form a stop surface or face, flaps or tabs 27 are formed up and the planar face of the tab 27 is used. As illustrated, two tabs 27 are provided with the mounting link 14 extending therebetween.

Figure 14:
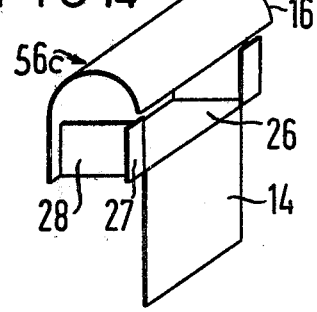

Another modification of the closure element is generally indicated at 56c, which is similar to the element 56b. As illustrated in FIG. 14, the two stop faces, which were formed by the fold-up tab 27, are reinforced and supported by tabs 28 which have been folded out of the plane of the abutment portion 26 with the fold line being approximately in the middle of the fold line for tab 27. Thus, the two support elements formed by the tabs 28 will prevent the stop faces of tabs 27 from being bent back due to the action of the shrinkage forces.

Figure 15:
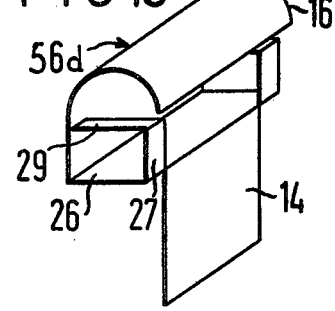
Figure 16:
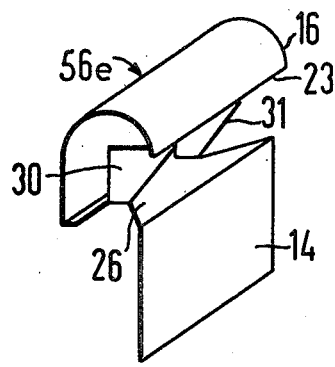

Another modification of the closure element is generally indicated at 56d in FIG. 15. Here, the stop faces of tabs 27 are supported by the tabs being bent to form the support portions or tabs 29 which will engage the planar portion 43 above the abutment surface or portion 26. The other relationships of the element 56d are the same as in the previous modifications of the embodiments.

In the modifications of the previously described embodiment of the connecting elements, such as the element 56 of FIG. 6, element 56a of FIG. 7, element 56b of FIG. 13, element 56c of FIG. 14 and element 56d of FIG. 15, each of the stop surfaces was formed by an edge or surface which extends substantially radially outward from the abutment surface or portion 26. However, the modification 56e of FIG. 16 has the tabs 30 with the edge 31 extending at an angle to the portion 26 as the tab 30 is raised. Thus, the edges 31 form an acute angle with the surface or portion 26 and form an undercut facing outwardly toward the free edge 23 of the arcuate portion 16. By so doing, this type of undercut is formed so that under the influence of shrinkage forces, the edges of the opening 9 inserted over the element 56e will be forced into greater interlocking arrangements to a greater degree due to the shrinkage forces. The oblique positioning of edge 31 further guarantees that the second longitudinal edge 2 is automatically drawn as tightly as possible against the surface of the first longitudinal edge 3.

Figure 17:
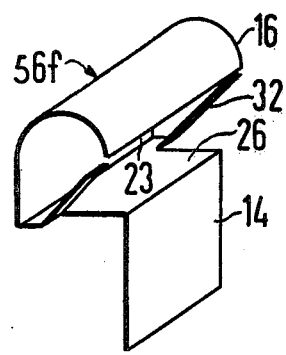

Another modification is illustrated by the element 56f of FIG. 17. In this modification, obliquely extending tabs 32 form flat surfaces to extend at an acute angle to the abutment portion or surface 26. Thus, during the shrinking operation, the edge of an aperture or opening 9 which is inserted over the element 56f will be moved by the portions 32 so that the second edge 2 is forced against the first longitudinal edge 3.

Figure 18:
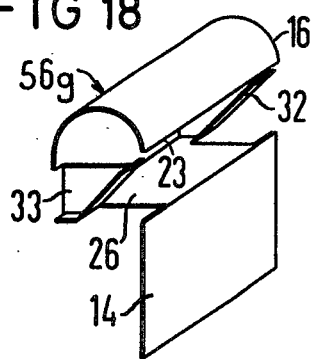

Another modification is illustrated by the closure element 56g of FIG. 18. Element 56g provides support tabs 33, which reinforce the tabs 32. As illustrated, the support tabs 33 are cut-out projections from the portion 43 while the tabs 32 are cut from the abutment surface 26.

Figure 19:
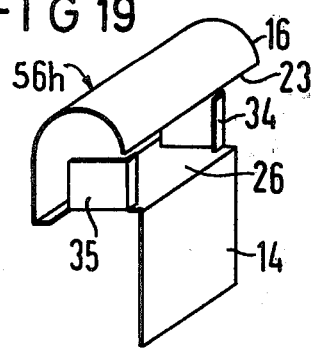

An embodiment of the closure element is generally indicated at 56h in FIG. 19. The closure element 56h is very similar to the embodiment 56a of FIG. 7, however, tabs having a portion 35 and a stop face portion 34 are provided. As illustrated, the tab 35 is bent around a first fold line to an upright position and then the stop face 34 is bent around a second fold line extending at right angles to the first fold line to form the stop face. By so doing, the overall stiffness of the closure element 56h is increased so that an edge of any aperture 9 of the longitudinal edge 2, which is pressed against the stop face 34 which has a planar area instead of an edge as in the element 56a.

In all of the examples mentioned hereinabove, the edge 23 of the arcuate portion 16 is projected so that it forms a latching device for engaging the outer surface adjacent the edge of each of the openings 9 of the second longitudinal edge 2. Thus the edge 23 prevents unintentional unlatching of the closure device.

Figure 20:
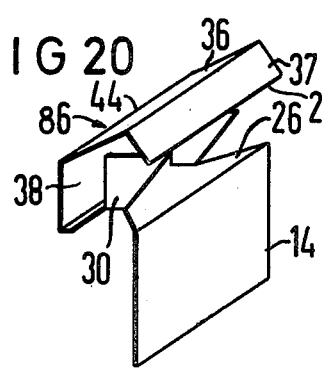

Each of the closure devices illustrated in FIGS. 6-19 has an arcuate portion 16, which terminates in an edge 23 which acts as a latching element. An embodiment of the closure element or device is generally indicated at 86 in FIG. 20. In this element, the arcuate portion 16 of the upper projecting part is replaced by a first planar portion 37 which has an edge 23 and is connected to an upstanding portion 38 by means of a second portion 36. The second planar portion 36 is folded from the portion 38 along a fold line 44. The edge 23 acts as the latching element. In the embodiment 86, tabs 30 similar to tabs of the closure element 56a (FIG. 16) are bent from the abutment portion 26 and have edges that form acute angles with the surface 26. Thus, in the element 86, the planar portion 38 at a fold line 44 is bent into the planar portion 36, which is connected by another fold line to the planar surface 37, and the portions 36 and 37 approximately simulate the arcuate portion 16.

Figure 21:
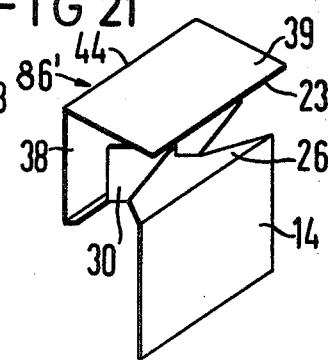

A modification of the element 86 is indicated at 86' in FIG. 21. In this embodiment, the portion 38 is connected by a fold line 44 to a single planar portion 39 which extends downward toward the abutment surface 36. A free edge 23 of portion 39 forms the latching element.

In each of the previously described closure elements, the closure element was mounted in the openings or slots 40 in the first edge 3 so as to hold the second edge in an overlapping sealing relationship such as illustrated in FIG. 3. Instead of having the two edges 2 and 3 in an overlapping relationship, it is sometimes desirable to have their actual edges 52 and 53 in a side-by-side relationship so that there is no overlapping material at the joint. When employing meltable adhesives particularly on an inside flap or extension 5, which covers the joint, the temperature required for activation of the adhesive cannot be completely or uniformly reached when the overlapping material is present. In order to obtain a joint that does not have the overlapping feature, a closure element such as 6b of FIG. 22 must be constructed with an elongated mounting link 14 so that the projecting part, which receives the opening 9, is disposed adjacent the actual edge 53. Such a closure element 6b will correspond to the element 6 except that the elongated links 14 will have a bridge 42 that extends tangentially to the first longitudinal edge 3 and adjacent the inside flap 5. These bridges 42 are of such a length that after engagement of the aperture 9 of the second longitudinal edge 2, the actual edge 52 of the second longitudinal edge 2 will be extending parallel to the actual edge 53 with a longitudinal gap 41 which is as slight or as small as possible as illustrated in FIG. 23.

The closure element 6b is a modification of the element 6 of FIG. 4, however, any of the elements of FIGS. 5-21 could be modified in a similar manner. The essence of the modification in the element 6b is that there is a bridge-like portion 42 between the fastening part and the actual closure part which extends across the slot 41. Also, it is noted that the mounting links 14 are introduced from the inside out through the slots 40 and thus are anchored on the outside surface of the member 1 by being bent over. Adjacent the inside surface of the edge 3 the links are bent at right angles to extend along the inside surface adjacent the flap or extension 5 to form the bridge 42. At the end of the bridge, another right angle bend forms the portion 8, which has a thickness substantially the same as the thickness of the edge 2. From the portion 8 the cylindrical structure of the element 6b with the latching element 7 is produced. After insertion of the projecting parts of the element 6b through the apertures or openings 9, the arrangement as illustrated in FIG. 23 will be obtained. As can be clearly seen, the latching element 7 will prevent an unintentional unlatching of the closure particularly due to tangential shrinkage forces which in turn will create a greater interlocking.

In conclusion, let it also be mentioned that given such an execution, the closure element 6b can also be inversely inserted. For example, the link 14 can be inserted into the slot 40 from the outside toward the inside and the closure part containing latching element 7 is inserted from the outside toward the inside so that only the bridge 42 would be visible from the outside of the cable sleeve. However, corresponding recesses would have to be provided on the extension or flap 5 to provide space for the inwardly projecting portions of the element 6b.

A final embodiment of the closure element is generally indicated at 56i in FIG. 24. In this embodiment, all of the folds are in the same direction which provides a simplification of the manufacturing technique. Thus, the mounting link 14 is again angled off to extend perpendicularly relative to the abutment surface or portion 26. The abutment portion 26 now receives a fold, which is inclined at an acute angle relative to the abutment portion 26 and serves as a stop face 45 for the edge of the opening 9 of the second longitudinal edge. A fold-back toward the surface of the cable sleeve increases the stability of the stop face 45. From the fold-back, the parallel surface 43 extends upwardly and terminates in the arcuate portion 16 which has already been described. The oblique positioning of the stop face 45 again causes a mutual, firm seating of the two longitudinal edges 2 and 3.

It should be noted that in the examples of the various modifications and embodiments of the closure elements illustrated in FIGS. 5–21 and 24, the mounted state of the cable sleeve has not been illustrated. However, it is submitted that from the illustrations in FIGS. 1, 2 and 3, the actual mounting of each of these elements would be obvious.

Although various minor modifications may be suggested by those versed in the art, it should be understood that we wish to embody within the scope of the patent granted hereon, all such modifications as reasonably and properly come within the scope of our contribution to the art.

We claim:

1. In a longitudinally divided cable sleeve having a strip-like sleeve member composed of a heat-shrinkable material, said sleeve member having two longitudinal edges with reinforcing inserts to form first and second edges with reinforced portions and coacting closure means for closing said edges together comprising closure elements mounted along the first edge and being engaged in openings formed in the reinforced portion of the second edge to hold the two edges in a closed position, the improvements comprising each of the elements having link means for mounting the element in axially extending slots in the area of the reinforced portion of the first edge, each element having abutment means for limiting the depth of insertion of the link means into each slot, each element having a projecting closure part for being inserted through an opening of the second edge with each projecting closure part having at least one latching element extending therefrom so that when the openings of the second edge are placed on the closing elements, said latching elements engage the outer surface adjacent each opening to prevent accidental and unintentional disassembly of the closure means.

2. In a longitudinally divided cable sleeve according to claim 1, wherein each closure element is a folded strip of material.

3. In a longitudinally divided cable sleeve according to claim 2, wherein each closure element has a resilient construction.

4. In a longitudinally divided cable sleeve according to claim 2, wherein each of the link means is formed of a portion of the strip of material which is narrower than the remaining portion and each of the abutment means comprises a laterally extending edge connecting the link means to the remaining portion of the closure element.

5. In a longitudinally divided cable sleeve according to claim 2, wherein the link means and the abutment means comprise a pair of portions of the strip material with the abutment means extending at right angles to the portion forming the link means and engaging an outer surface of the first edge as the link means extends through the slot.

6. In a longitudinally divided cable sleeve according to claim 2, wherein the link means includes a portion of the strip material and has a slit extending inwardly from an end thereof so that when mounting the link means, a portion of the link means is bent in each direction.

7. In a longitudinally divided cable sleeve according to claim 2, wherein the link means and abutment means are constructed so that the portion of the strip forming the link means is inserted radially from the outside toward the inside into each slot in the first longitudinal edge.

8. In a longitudinally divided cable sleeve according to claim 2, wherein the link means include an end portion of the strip having a first radially extending portion for extending radially through a slot in the longitudinal edge, said radial portion being connected to a bridge portion having an opposite end connected to a portion of the upstanding part, said upstanding part and first portion of the link means extending in the same direction so that when the link means is inserted in a slot in the reinforced portion of said first edge from the interior towards the outside, said bridge portion extends past the edge to position the upstanding part at a point spaced from the edge of the first edge portion so that as the openings of the second edge portion are inserted over the upstanding portions, the edge of the second edge portion lies immediately adjacent the first-mentioned edge to form a joint without any overlap.

9. In a longitudinally divided cable sleeve according to claim 2, wherein the closure element comprises a cylindrically designed portion formed out of the strip of material, at least one latching element being formed by a tangentially bent-out portion of said cylindrical wall section, each edge of the cylindrical wall section extending into strip portions forming the link means with each portion forming the link means having a width less than the axial width of the cylindrical portion with the lateral offset forming the abutment means.

10. In a longitudinally divided cable sleeve according to claim 2, wherein the projecting part comprises a semi-circular curved portion of said strip material with at least one latching element tangentially projecting therefrom, said semi-circular curve portion having a fold line with a planar portion extending therefrom having lateral offset edges forming said abutment means and an additional portion extending as said link means, the other edge of said semi-circular curve portion having a tangentially extending portion extending substantially parallel to said link portion and forming a support with an edge bearing against the outer surface of the cable sleeve when the element is mounted thereon.

11. In a longitudinally divided cable sleeve according to claim 2, wherein the projecting part of the closing element comprises an arcuate portion having a semi-circular cross-section, said arcuate portion terminating in a first edge directed towards the cable sleeve and forming said latching element, the other edge of said arcuate portion extending into a planar portion, said planar portion having means forming said abutment means, said element having means forming at least one stop surface disposed inwardly of said one edge to limit the movement of an edge of an aperture beneath the arcuate portion.

12. In a longitudinally divided cable sleeve according to claim 11, wherein the means forming a stop surface comprises a fold-back portion attached to said first edge of said arcuate portion.

13. In a longitudinally split cable sleeve according to claim 11, wherein the means forming a stop surface comprises tabs folded from the strip material.

14. In a longitudinally divided cable sleeve according to claim 13, wherein said tabs are folded at right angles relative to the surface of the planar portion.

15. In a longitudinally divided cable sleeve according to claim 14, wherein said tabs also have edges forming said abutment means.

16. In a longitudinally divided cable sleeve according to claim 11, wherein the abutment means comprises an abutment portion extending at right angles to said planar portion and right angles to a portion forming said link means so that when mounting said closure element on the cable sleeve, said abutment portion engages a surface of said cable sleeve.

17. In a longitudinally divided cable sleeve according to claim 16, wherein the link means comprises a portion connected to the abutment portion by a reverse bend portion, said reverse bend portion being said means forming a stop surface.

18. In a longitudinally divided cable sleeve according to claim 16, wherein said means forming at least one stop surface comprises at least one tab being cut and raised from said abutment portion.

19. In a longitudinally divided cable sleeve according to claim 18, which includes means reinforcing said tabs forming the stop surfaces.

20. In a longitudinally divided cable sleeve according to claim 19, wherein said means for reinforcing comprise said tab having two portions extending at right angles to each other.

21. In a longitudinally divided cable sleeve according to claim 16, wherein the stop surfaces extend at an acute angle to the abutment portion.

22. In a longitudinally divided cable sleeve according to claim 21, wherein said stop surfaces are formed by planar surfaces of tabs bent from said abutment portion.

23. In a longitudinally divided cable sleeve according to claim 22, which includes means of reinforcing said tabs.

24. In a longitudinally divided cable sleeve according to claim 16, wherein the means forming the stop surface comprises a planar portion bent at an acute angle from the abutment portion and connected to the first-mentioned planar portion by an angular planar portion.

25. In a longitudinally divided cable sleeve according to claim 2, wherein the projecting part includes a first planar portion extending radially from the abutment means, means connecting said first planar portion to a second planar portion extending at an angle thereto with a free edge extending toward said abutment means to form said latching element.

26. In a longitudinally divided cable sleeve according to claim 25, wherein the abutment means comprise a planar portion extending at right angles to a portion of the strip forming the link means and parallel to an outer surface of said cable sleeve, said closure element including stop surfaces positioned inward to the free edge of said second planar portion forming the latching element.

27. In a longitudinally split cable sleeve according to claim 25, wherein the means connecting the first planar portion to the second planar portion includes a third planar portion extending at an angle to both the first and second planar portions.

28. In a longitudinally divided cable sleeve according to claim 2, wherein said strip-like material is a corrosion-proof material.

29. In a longitudinally divided cable sleeve according to claim 1, wherein one of the first and second longitudinal edges includes an interior extension overlying the closed position of the edges formed by the closure means.

30. In a longitudinally divided cable sleeve according to claim 1, wherein the link means are secured to the edge by means of adhesive.

31. In a longitudinally divided cable sleeve according to claim 1, wherein the link means are anchored to the edge by extending through a slot therein and being anchored to the opposite edge or surface.

32. In a longitudinally divided cable sleeve according to claim 1, wherein the reinforcing inserts consist on an embedded strip of metal.

33. In a longitudinally divided cable sleeve according to claim 1, wherein the reinforcing inserts consist of embedded woven fibers.

34. In a longitudinally divided cable sleeve according to claim 1, wherein said closure element includes stop faces for engaging an edge of the opening in the second edge.

* * * * *